US012359983B2

(12) United States Patent
Perumal et al.

(10) Patent No.: US 12,359,983 B2
(45) Date of Patent: Jul. 15, 2025

(54) HIGH ACCURACY COMPUTATIONAL METHOD IN RESISTANCE TEMPERATURE DETECTOR MEASUREMENTS

(71) Applicant: Hamilton Sundstrand Corporation, Charlotte, NC (US)

(72) Inventors: Rajkumar Perumal, Karnataka (IN); Nageswara Rao Kalluri, Karnataka (IN); Pravinsharma Kaliyannan Eswaran, Karnataka (IN); Sridhar Katakam, Karnataka (IN); Surendra Somasekhar Valleru, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 442 days.

(21) Appl. No.: 17/846,059

(22) Filed: Jun. 22, 2022

(65) Prior Publication Data
US 2023/0341274 A1    Oct. 26, 2023

(30) Foreign Application Priority Data

Apr. 25, 2022    (IN) .............................. 202211024116

(51) Int. Cl.
*G01K 7/16*    (2006.01)
*G01K 1/022*    (2021.01)
(Continued)

(52) U.S. Cl.
CPC .............. *G01K 7/16* (2013.01); *G01K 1/022* (2013.01); *G01K 7/20* (2013.01); *G01K 7/22* (2013.01); *G01K 2219/00* (2013.01)

(58) Field of Classification Search
CPC ............ G01K 7/16; G01K 1/022; G01K 7/20; G01K 7/22; G01K 2219/00
See application file for complete search history.

(56) References Cited

U.S. PATENT DOCUMENTS 4,102,199 A * 7/1978 Tsipouras ............... G01K 1/026
374/170
5,828,567 A * 10/1998 Eryurek ................... G07C 3/00
702/182

(Continued)

FOREIGN PATENT DOCUMENTS

CN    110579285 A    12/2019

OTHER PUBLICATIONS

European Search Report for Application No. 23169771.5, mailed Oct. 5, 2023, 8 pages.

(Continued)

*Primary Examiner* — Laura Martin
*Assistant Examiner* — Philip L Cotey
(74) *Attorney, Agent, or Firm* — CANTOR COLBURN LLP

(57) ABSTRACT

A resistance temperature detector includes a single channel analog to digital converter (ADC) comprising a first channel input and a reference voltage input. The detector also includes a resistance temperature detector (RTD) element connected to the first channel input and a current sense element in series with the RTD element. The current sense element is connected to the reference voltage input. The detector also includes a power source connected to the RTD element and a controller configured to: receive an output of the single channel ADC to determine a temperature at the RTD element. The output of the single channel ADC comprises a bit representation of a ratio between a first voltage across the RTD element and a reference voltage across the current sense element.

19 Claims, 4 Drawing Sheets

(51) Int. Cl.
*G01K 7/20* (2006.01)
*G01K 7/22* (2006.01)

(56) References Cited

U.S. PATENT DOCUMENTS

| | | | | |
|---|---|---|---|---|
| 6,059,452 | A * | 5/2000 | Smith | G01K 7/42 |
| | | | | 374/E7.042 |
| 7,661,878 | B1 * | 2/2010 | Lall | G01K 7/01 |
| | | | | 374/170 |
| 9,470,585 | B2 * | 10/2016 | Hong | G01K 7/22 |
| 9,488,529 | B2 * | 11/2016 | Hong | G01K 7/16 |
| 2004/0125857 | A1 * | 7/2004 | Sprock | G01K 7/20 |
| | | | | 374/185 |
| 2010/0082285 | A1 * | 4/2010 | Casasso | G01K 7/21 |
| | | | | 374/185 |
| 2010/0145652 | A1 * | 6/2010 | Casasso | G01K 7/20 |
| | | | | 374/E7.018 |
| 2013/0314110 | A1 * | 11/2013 | McNeill | G01K 7/24 |
| | | | | 324/705 |
| 2014/0340100 | A1 * | 11/2014 | Popa | G01R 27/00 |
| | | | | 324/691 |
| 2014/0355650 | A1 * | 12/2014 | Hong | G01K 7/22 |
| | | | | 374/170 |
| 2016/0003686 | A1 * | 1/2016 | Matsumoto | G01F 25/10 |
| | | | | 374/1 |
| 2016/0178450 | A1 * | 6/2016 | Trifonov | G01K 7/01 |
| | | | | 374/183 |
| 2020/0182707 | A1 * | 6/2020 | Badets | G01K 7/245 |
| 2020/0292478 | A1 * | 9/2020 | Chattoraj | G01N 17/00 |
| 2021/0025764 | A1 * | 1/2021 | Chehlarov | G01K 1/08 |
| 2021/0247241 | A1 * | 8/2021 | Nagata | G01K 7/20 |
| 2022/0065709 | A1 * | 3/2022 | Li | H03F 3/087 |
| 2022/0099500 | A1 * | 3/2022 | Li | G01K 1/026 |
| 2022/0316957 | A1 * | 10/2022 | Park | G01K 7/16 |

OTHER PUBLICATIONS

Machine Translation of CN110579285 (A), Published: Dec. 17, 2019, 14 pages.

European Transmittal of third party observations to applicant for Application No. 23169771.5, mailed Jan. 20, 2025, 5 pages.

\* cited by examiner ized to input/output interfaces rather than computational engines. When RTDs are interfaced to FPGAs, accuracy of the measurement suffers due to the computation carried out.

HIGH ACCURACY COMPUTATIONAL METHOD IN RESISTANCE TEMPERATURE DETECTOR MEASUREMENTS

CROSS-REFERENCE TO RELATED APPLICATIONS

This application claims the benefit of Indian Patent Application No. 202211024116 filed Apr. 25, 2022, which is incorporated herein by reference in its entirety.

BACKGROUND

The present invention generally relates to temperature sensors, and more specifically to, a high accuracy computational method in field programmable gate array based resistance temperature detector temperature measurements.

Resistance temperature detectors (RTDs) and thermistors are the most used temperature sensors due to their low cost and reliability. RTDs are sensors used to measure temperature. Many RTD elements include a length of fine wire wrapped around a ceramic or glass core but other constructions are also used. The RTD wire is a pure material, typically platinum, nickel, or copper. The material has an accurate resistance/temperature relationship which is used to provide an indication of temperature. In commercial applications, multiple RTDs as well as other sensors are utilized and are interfaced to field programmable gate arrays (FPGAs). FPGAs are best optimized to input/output interfaces rather than computational engines. When RTDs are interfaced to FPGAs, accuracy of the measurement suffers due to the computation carried out.

BRIEF DESCRIPTION

Embodiments of the present invention are directed to a resistance temperature detector. A non-limiting example of the system includes a single channel analog to digital converter (ADC) comprising a first channel input and a reference voltage input, a resistance temperature detector (RTD) element connected to the first channel input; a current sense element in series with the RTD element, wherein the current sense element is connected to the reference voltage input; a power source connected to the RTD element; and a controller. The controller is configured to receive: an output of the single channel ADC to determine a temperature at the RTD element, wherein the output of the single channel ADC comprises a bit representation of a ratio between a first voltage across the RTD element and a reference voltage across the current sense element.

In addition to one or more of the features described above, or as an alternative to any of the foregoing embodiments, the bit representation of the ratio between the voltage across the RTD element and the voltage across the current sense element comprises a full scale bit representation when the first voltage is equal to the reference voltage.

In addition to one or more of the features described above, or as an alternative to any of the foregoing embodiments, the bit representation of the ratio between the voltage across the RTD element and the voltage across the current sense element comprises of a half a full scale bit representation when the first voltage is half a value of the reference voltage.

In addition to one or more of the features described above, or as an alternative to any of the foregoing embodiments, the controller comprises a field programmable gate array (FPGA).

In addition to one or more of the features described above, or as an alternative to any of the foregoing embodiments, the detector can include a first amplifier and a second amplifier. The first amplifier is connected between the RTD element and the ADC.

In addition to one or more of the features described above, or as an alternative to any of the foregoing embodiments, the RTD element comprises a RTD resistor.

In addition to one or more of the features described above, or as an alternative to any of the foregoing embodiments, the RTD resistor comprises platinum.

In addition to one or more of the features described above, or as an alternative to any of the foregoing embodiments, the current sense element comprises a resistor.

In addition to one or more of the features described above, or as an alternative to any of the foregoing embodiments, the power supply comprises a constant current source.

Also disclosed is a method that can be used with any of the above controllers. The method includes: receiving, by a controller, a bit output from an analog to digital converter, wherein the bit output represents a ratio between a first voltage and a reference voltage; and determining, by the controller, a temperature at a resistance temperature detector (RTD) element based on the ratio, wherein the first voltage comprises a voltage across the RTD element, wherein the reference voltage comprises a voltage across a current sense element, and wherein the current sense element is in series with the RTD element.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Figure 1:
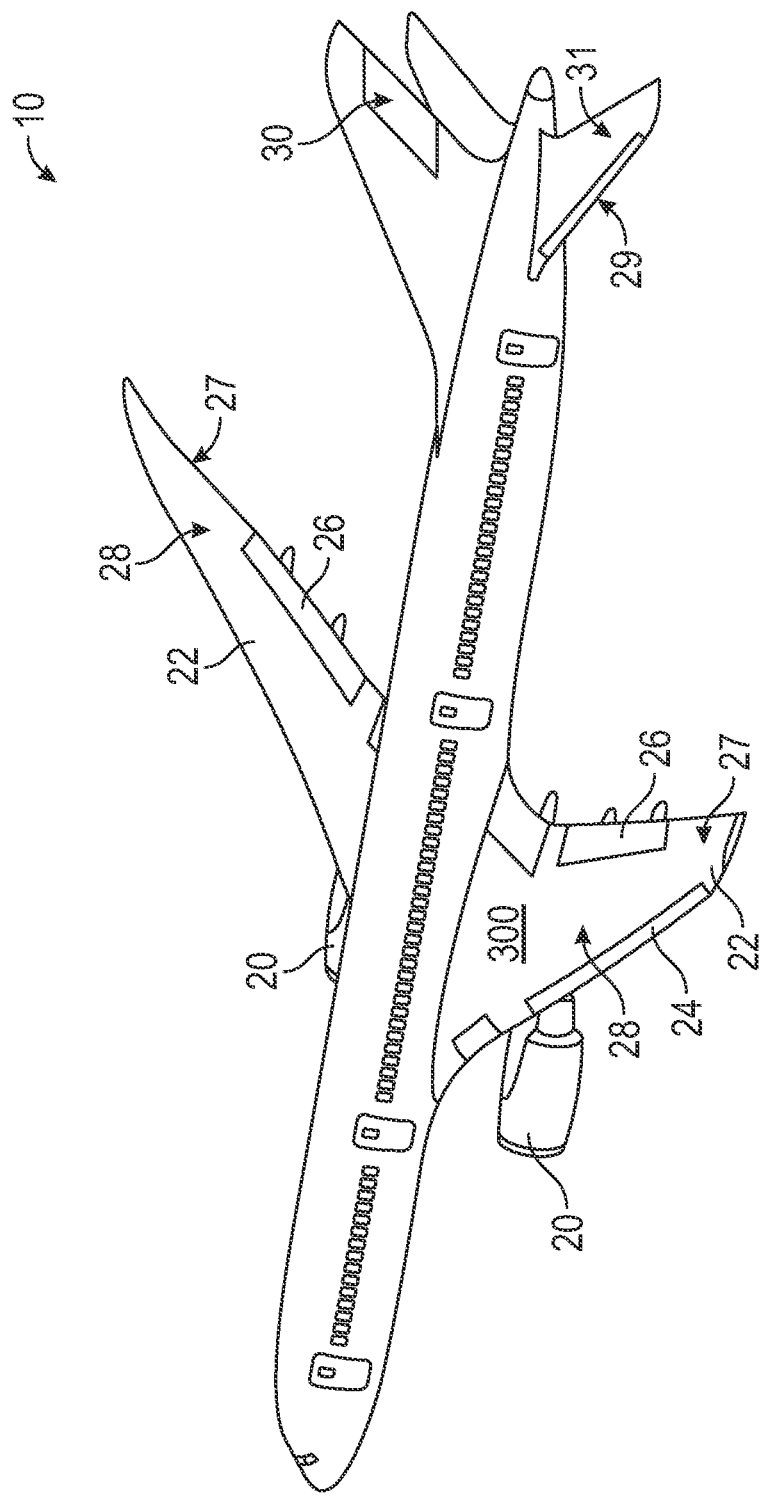
FIG. 1 is a perspective view of an aircraft that may incorporate embodiments of the present disclosure.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together. The aircraft 10 also includes a system for temperature measurement 300 (described in greater detail in FIG. 3) which allows for high accuracy temperature determination using RTDs to be utilized for various instrumentation on board the aircraft 10.

Turning now to an overview of technologies that are more specifically relevant to aspects of the disclosure, traditional temperature measurements with RTDs as a sensor require current excitation (either constant or variable) to develop a voltage across the sensor element. The voltage and current through the RTD sensing element provides a resistance value which is then translated to a temperature based on the respective sensor standards (e.g., what type of material is used for the sensing element). With the digitization of physical data becoming more prevalent, these resistance/temperature values are being converted into bit streams for processing.

Due to a higher number of I/O requirements, temperature sensors are interfaced to FPGAs in aerospace applications. These FPGAs are best optimized for I/O interfaces rather than as computation engines. When RTDs are interfaced to an FPGA, the accuracy of the measurement can suffer due to the computation carried out. This error can be improved with higher computational data ranges at the costs of resource consumption.

Figure 2:
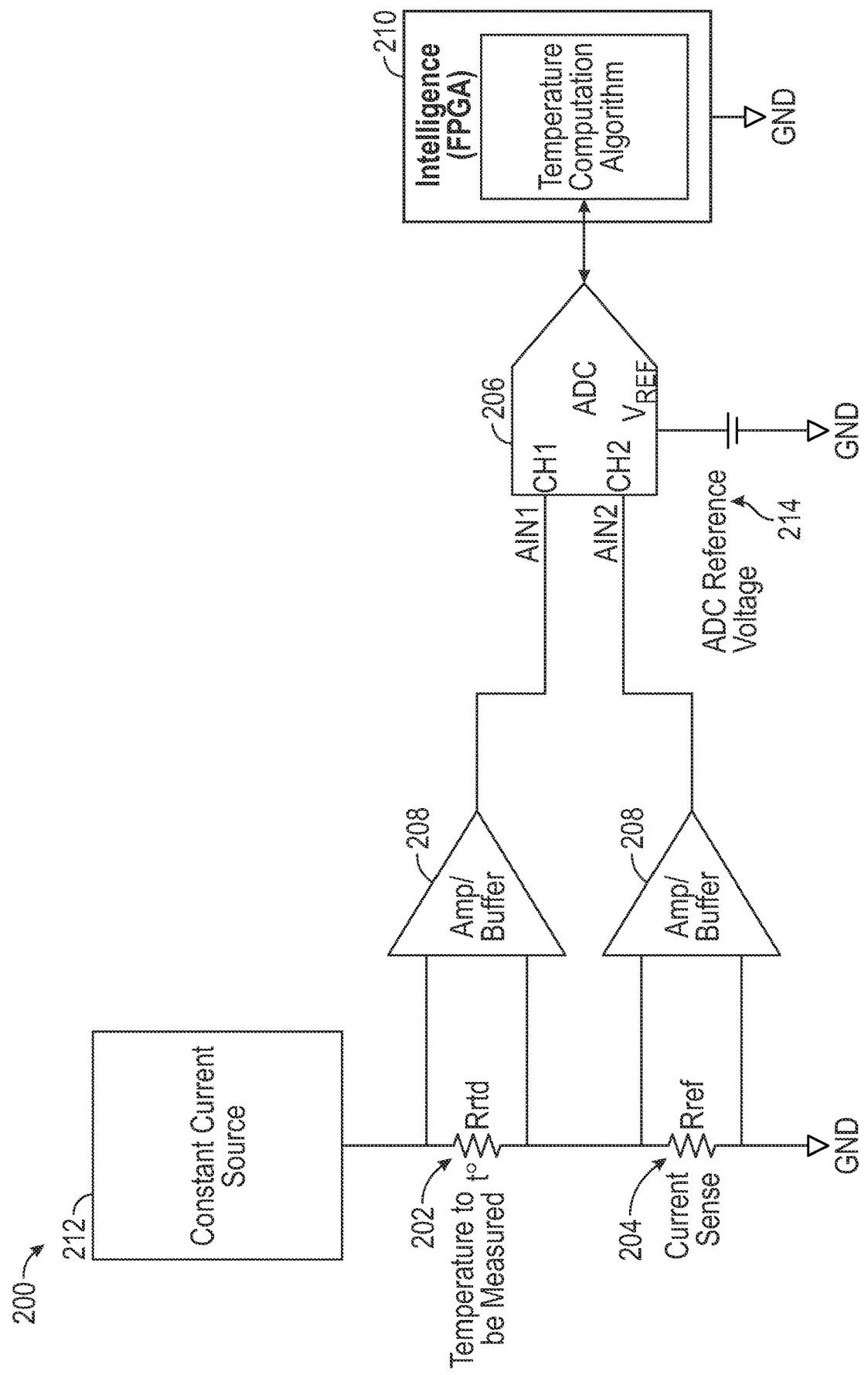
FIG. 2 depicts an exemplary RTD using an FPGA.

FIG. 2 depicts an exemplary RTD using an FPGA. The RTD 200 includes an RTD sensing element 202 in series with a current sense element 204 and a constant current source 212. The RTD 200 also includes a set of amplifier/buffers 208 that amplify the voltage measured across the RTD sensing element 202 and the current measured at the current sensing element 204. The output of each amplifier/buffer 208 is fed into a two channel (CH1, CH2) analog to digital converter (ADC) 206. The RTD voltage and current are digitized by the ADC 206 with a fixed reference voltage 214. This digitized data is outputted to an FPGA 210 to derive a resistance value before translating to a temperature measurement using the temperature computation algorithm 220. In the ADC 206, the RTD voltage data is input into channel 1 and the RTD current data is input into channel 2. The resistance calculation is carried out within the FPGA. In one or more embodiments, the excitation current could be maintained constant by design or assumed to be constant within a design tolerance. In this approach, especially with issues related to FPGA interfaces, the accuracy of the measurements depends on the computational errors that are associated with the voltage-current ratio computation by the FPGA for a given data range and logic cell consumption. Also, this RTD 200 system requires two ADC measurement channels and a higher ADC bandwidth for digitization.

Figure 3:
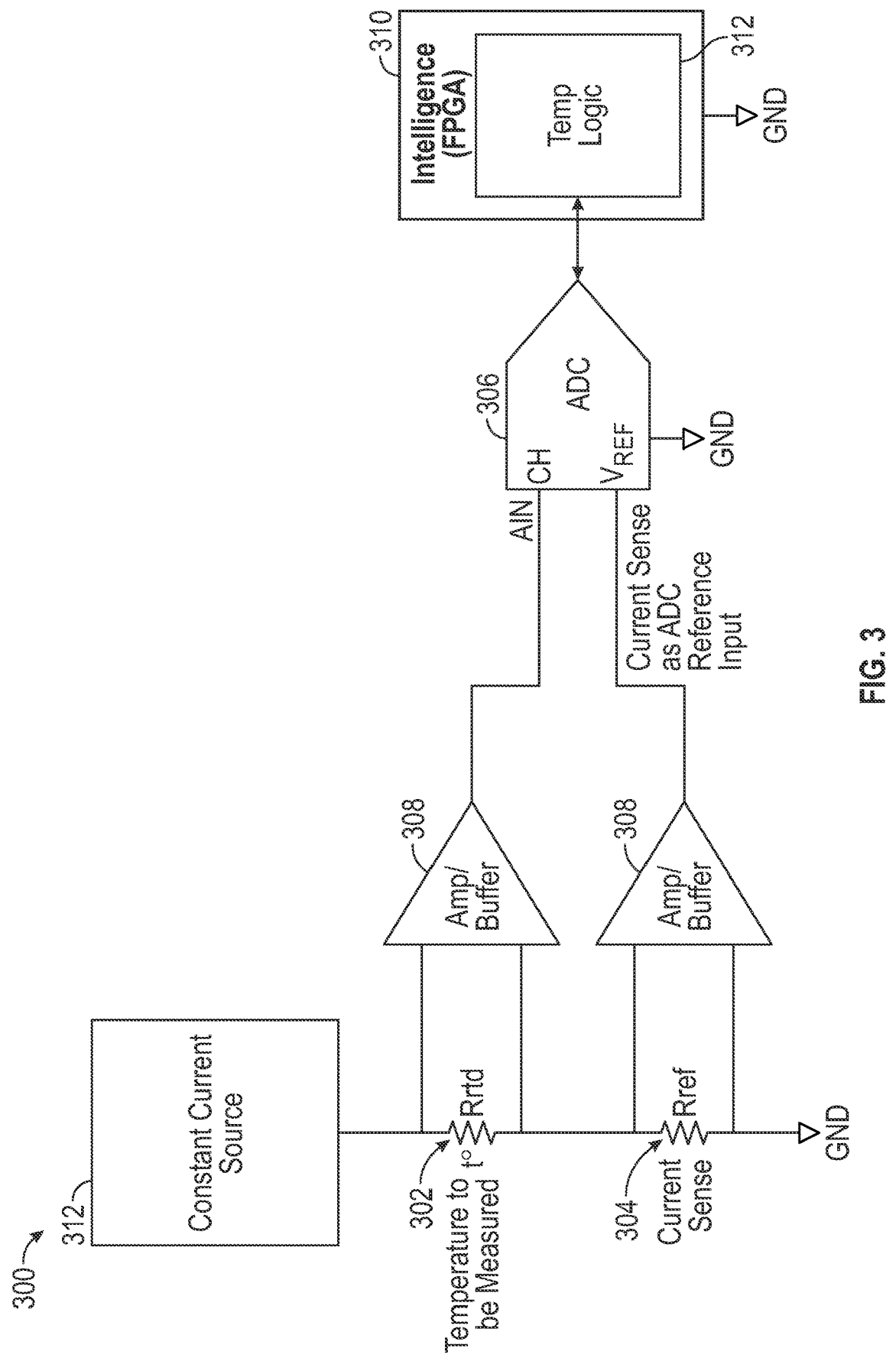
FIG. 3 depicts an RTD system according to one or more embodiments.

To address the above mentioned issues, FIG. 3 depicts an RTD system according to one or more embodiments. The RTD system 300 includes an RTD element 302 and a current sense element 304. In one or more embodiments, the RTD element 302 is an RTD resistor which, typically, includes a platinum 100-type RTD (Pt100) or a platinum 1000-type RTD (Pt1000). A Pt100 RTD has a nominal resistance of 100 Ω at ice point (e.g., 0° C.), while a Pt1000 RTD has a nominal resistance of 1,000 Ω at 0° C. Linearity of the characteristic curve, operating temperature range, and response time are the same, or substantially the same, for both a Pt100 RTD and a Pt1000 RTD. The temperature coefficient of resistance is also the same, or substantially the same, for both a Pt100 RTD and a Pt1000 RTD. The RTD temperature measurement is determined based on the principle that the resistance of the metal element changes with temperature. In practice, the RTD element 306 is located in proximity to the area where temperature is to be measured. An electrical voltage is applied across the RTD to induce current flow through the metal element.

Additionally, the RTD system 300 includes a constant current source 312 and a set of amplifier/buffers 308. The constant current source 312 provides a current through the series connected RTD element 302 and the current sense element 304. Here, the RTD element 302 and the current sense element 304 are directly connected and are connected between the constant current source 312 and ground. However, other resistive elements could be added in these connections as needed. It shall be understood that as temperature changes, the resistance of the RTD element 302 will change. This will change both the voltage across (Vrtd) and current (Irdt) through it is constant as maintained by constant current source 212. Thus, as Rrtd changes, due to a constant current being provided, Vrtd will also change. Similarly, the voltage across the current sensor resistor Rref (which is a fixed resistance value) is always a constant irrespective of the resistance change in RTD due to the constant current source 212.

The amplifier/buffers 308 amplify the RTD voltage across the RTD element 302 and the voltage across the current sense element 304 The gains of the amplifier/buffers 308 can be set such that the Vref voltage is always higher than the Vrtd per a given RTD temperature measurement range, RTD type, constant current flowing through both RTD and Current sense resistor, Rref value. This type of gain selection ensure the ratio of ADC output bit is less than 1 and satisfies the basic ADC relation between input voltage (at Ain) to the input reference (Vref). As such, in the following discussion, the gain is omitted from the values.

In one or more embodiments, the RTD voltage Vrtd is inputted to a single channel ADC 306. The single channel ADC 306 has one and only one input in one embodiment. The single channel ADC 306 also include a reference voltage input Vref. As opposed to prior systems where Vref is constant and it is supplied by external electronic component, herein, Vref is fixed based on the current sense resistor selection and the constant current provided by the constant current source 212 irrespective of the changes in the resistance value of Rrtd. The ADC 306 includes full scale bit if the input voltage is equal to the reference voltage. Otherwise, the output of the ADC 306 is half (½) of the full sized bits if the input voltage is half (½) of the reference voltage and so on and so forth.

In one or more embodiments, the ADC output described above is a ratio between the voltage (Vrtd) on the single input (CH) to ADC 306 to the reference voltage, Vref. The output of the ADC 306 is fed into the FPGA 310, processor, or controller. In one embodiment, the ratio is the only input provided to the FPGA 310.

Thus, as connected, the digital output of the ADC 306 can be expressed as a ratio of Vrtd to Vref as shown below. It shall be understood that the current Irtd is the same through both the RTD element 302 and the current sense element 304.

$$Vrtd/Vref = (Rrtd * \cancel{Irtd})/(Rref * \cancel{Irtd}) = Rrtd/Rref$$

Thus, the output of the ADC 306 is a digital representation of Rrtd/Rref. The FPGA 301 can be configured to multiply this ratio by Rref to determine Rrtd ("Rref" is a fixed and stable resistance and won't change at all based on the component/design selection). After resistance Rrtd is known, if can be converted to a temperature by the temperature determination logic 312 in the FPGA 310. This can be done with a look up table method or by applying a formula. As can be seen from the above, this is different than in the convention method where the FPGA received two values (Vrtd, Vref) to compute the ratio and Rrtd as explained above In one or more embodiments, the above configuration is better suited for an FPGA based computation engine with reduced logic cells due to missing ratio computation in temperature computation. This also improves the accuracy cause because of a missing reference, fewer logic cell consumption, single channel and lower sampling ADCs. It shall be understood that the term single as applied to inputs to either or both of the ADC and the FPGA can mean one and only one. Also, the FPGA can be referred to herein as a controller from time to time.

Figure 4:
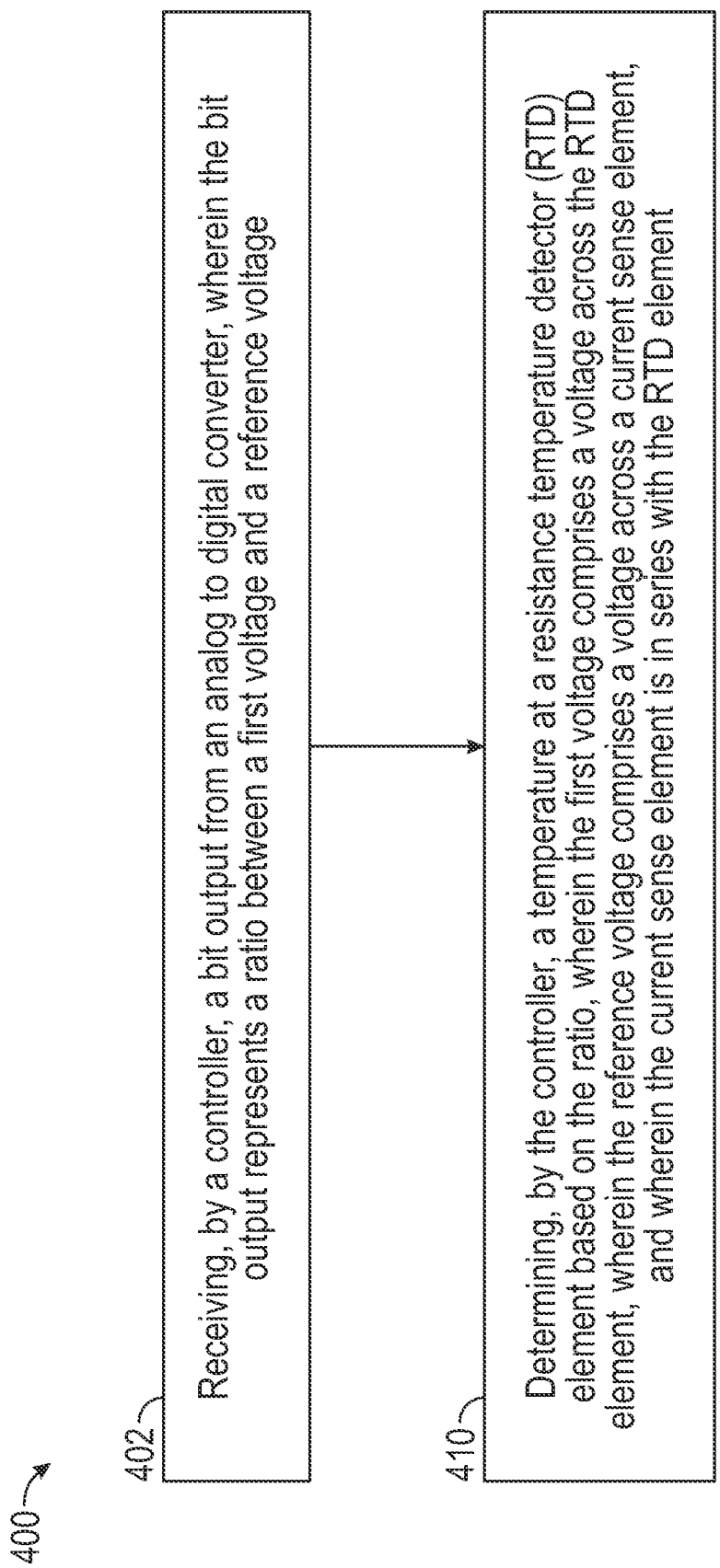
FIG. 4 depicts a flow diagram of a method for determining temperature in a resistance temperature detector according to one or more embodiments.

FIG. 4 depicts a flow diagram of a method for determining temperature in a resistance temperature detector according to one or more embodiments. The method 400 includes receiving, by a controller, a bit output from an analog to digital converter, wherein the bit output represents a ratio between a first voltage and a reference voltage, as shown at block 402. And at block 404, the method 400 includes determining, by the controller, a temperature at a resistance temperature detector (RTD) element based on the ratio, wherein the first voltage comprises a voltage across the RTD element, wherein the reference voltage comprises a voltage across a current sense element, and wherein the current sense element is in series with the RTD element.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A resistance temperature detector comprising:
a current source;
a single channel analog to digital converter (ADC) comprising a first channel input and a reference voltage input;
a resistance temperature detector (RTD) element connected to the first channel input and to the current source;
a current sense element connected in series with the RTD element between the RTD element and ground, wherein the current sense element is connected to the reference voltage input;
a controller configured to:
receive an output of the single channel ADC to determine a temperature at the RTD element, wherein the output of the single channel ADC comprises a bit representation of a ratio between a first voltage across the RTD element and a reference voltage across the current sense element.

2. The resistance temperature detector of claim 1, wherein the bit representation of the ratio between the voltage across the RTD element and the voltage across the current sense element comprises:
a full scale bit representation when the first voltage is equal to the reference voltage.

3. The resistance temperature detector of claim 1, wherein the bit representation of the ratio between the voltage across the RTD element and the voltage across the current sense element comprises:
half of a full scale bit representation when the first voltage is half a value of the reference voltage.

4. The resistance temperature detector of claim 1, wherein the controller comprises a field programmable gate array (FPGA).

5. The resistance temperature detector of claim 1 further comprising: a first amplifier and a second amplifier.

6. The resistance temperature detector of claim 5, wherein the first amplifier is connected between the RTD element and the ADC.

7. The resistance temperature detector of claim 1, wherein the RTD element comprises a RTD resistor.

8. The resistance temperature detector of claim 7, wherein the RTD resistor comprises platinum.

9. The resistance temperature detector of claim 1, wherein the current sense element comprises a resistor.

10. The resistance temperature detector of claim 1, wherein the current source is a constant current source.

11. The resistance temperature detector of claim 1, wherein a current through the RTD element is constant as voltage across the RTD element changes.

12. A method comprising:
receiving, by a controller, a bit output from an analog to digital converter, wherein the bit output represents a ratio between a first voltage and a reference voltage created by providing a constant current with a constant current source through a resistance temperature detector (RTD) and a current sense element connected in series between the constant current source and ground; and
determining, by the controller, a temperature at the RTD element based on the ratio, wherein the first voltage comprises a voltage across the RTD element, wherein the reference voltage comprises a voltage across the current sense element.

13. The method of claim 12, wherein the bit output comprises a full scale bit representation when the first voltage is equal to the reference voltage.

14. The method of claim 12, wherein the bit output comprises half of a full scale bit representation when the first voltage is half a value of the reference voltage.

15. The method of claim 12, wherein the controller comprises a field programmable gate array (FPGA).

16. The method of claim 12, wherein the RTD element comprises a RTD resistor.

17. The method of claim 16, wherein the RTD resistor comprises platinum.

18. The method of claim 12, wherein the current sense element comprises a resistor.

19. The method of claim 12, wherein a current through the RTD element is constant as voltage across the RTD element changes.

* * * * *